United States Patent [19]

Voigtlaender

[11] 3,949,862

[45] Apr. 13, 1976

[54] FEED REGULATING CONVEYOR BIN

[75] Inventor: Herbert Voigtlaender, Weiterstadt, Germany

[73] Assignee: Firma Carl Schenck AG, Darmstadt, Germany

[22] Filed: Dec. 6, 1974

[21] Appl. No.: 530,366

[30] Foreign Application Priority Data

July 4, 1974 Germany............................ 2432135

[52] U.S. Cl.................................. 198/57; 198/155
[51] Int. Cl.$^2$........................ B41J 1/16; B41J 35/12
[58] Field of Search ............. 198/102, 158, 168, 57, 198/155; 222/238

[56] References Cited

UNITED STATES PATENTS

| | | | |
|---|---|---|---|
| 1,768,534 | 7/1930 | Aiken ................................. | 198/155 |
| 1,890,762 | 12/1932 | Whyte........................... | 198/155 UX |
| 2,348,056 | 5/1944 | Cheely et al................. | 198/155 UX |

FOREIGN PATENTS OR APPLICATIONS

| | | | |
|---|---|---|---|
| 1,084,199 | 6/1960 | Germany ............................ | 198/57 |
| 1,109,752 | 4/1968 | United Kingdom................. | 198/155 |

*Primary Examiner*—Robert B. Reeves
*Assistant Examiner*—David A. Scherbel
*Attorney, Agent, or Firm*—Wolfgang G. Fasse; Willard W. Roberts

[57] ABSTRACT

The present feed regulating conveyor bin has a lower conveyor for conveying fibrous materials toward a discharge device including a pair of inclined rows of spiked rollers. A stud link chain conveyor is provided above the lower conveyor in the upper portion of the bin housing. Flexible, smooth surfaced pieces are hinged to each of the stud links. The surface pieces have a width substantially equal to the width of the housing and a length greater than the distances between adjacent stud links of the chain. A platform is provided beneath the upper course of the stud link chain conveyor in the region of an inlet opening on the upper surface of the housing, to support the surface pieces in a horizontal position for receiving and transporting fibrous material. At the end of the platform the surface pieces hinge downwardly to drop the fibrous material onto the lower conveyor belt or if a pile of material is already present thereon, to carry the fibrous material on the other sides of the surface pieces supported by the top of the pile of material, for discharge at the end of the pile away from the discharge device.

11 Claims, 4 Drawing Figures

FEED REGULATING CONVEYOR BIN

BACKGROUND OF THE INVENTION

This invention relates to feed regulating conveyor bins for loose, fibrous material, such as fibrous material for the production of hard fiber-board, chip board or the like.

Feed regulating conveyor bins of the type with which the invention is concerned are provided, for example, in order to regulate the feed of a fibrous material to a processing system employing the fibers. In a conveyor bin of this type employed in the past, as disclosed in German Patent No. 1,084,199 a bin is provided comprised of a housing having a stud link chain conveyor arranged in the upper portion thereof. A platform is arranged under the upper course of the stud link chain conveyor in the region of an inlet opening in the upper portion of the housing, so that material fed into the opening is pulled along the platform by means of stud links on the conveyor. At the end of the platform, the material falls downwardly to a second lower platform, and the stud links of the lower run of the conveyor move the fibrous material over the lower platform which has openings therein through which the material falls. In this arrangement, the material is discharged from the bin by a discharge device in the form of a single row of spiked rollers arranged one above the other.

In the above described arrangement, the delicate fibrous material may be compressed in many places in the bin, so that local regions of undesirably increased density are produced. For example, the material in the above described arrangement may be compressed in front of and under the studs of the stud link chain conveyor, especially in the region where the stud link chain conveyor runs over the openings in the lower platform. In addition, since the material is drawn over the platforms by the stud links of the conveyor, friction between the material and the platforms may result in damage of a considerable portion of the material. Still further, when the fibrous material becomes stuck on the spikes of the rollers of the discharge device, it may be returned to the bin which results in the undesirable local compression of material in the bin.

OBJECTS OF THE INVENTION

In view of the foregoing, it is the aim of the present invention to achieve the following objects singly or in combination:

to provide a feed regulating conveyor bin that overcomes the above disadvantages of known devices;

to provide a feed regulating conveyor bin, wherein frictional contact is avoided between support platforms for a fibrous material as the fibrous material is conveyed across the platforms;

to provide a feed regulating conveyor bin, wherein local compression of material in the bin due to sticking of fibrous material on the spikes of a spiked roller discharge device is inhibited; and to provide a feed regulating conveyor bin wherein the feeding, storing, and discharging of the material is effected without damage to the material, and without compression or increases in the local density of the material, whereby materials that are especially difficult to store and discharge may be readily handled and wherein the throughput is on a first-in, first-out basis.

SUMMARY OF THE INVENTION

Briefly stated, in accordance with the invention, the above objects are achieved by providing a feed regulating conveyor bin having a housing with a lower conveyor and an upper stud chain conveyor. Surface pieces are affixed to the stud links of the stud link chain conveyor, the surface pieces having lengths greater than the distance between adjacent studs, and widths substantially equal to the width of the housing. A platform is arranged under the upper course of the stud link chain conveyor in the region of the inlet opening, to support the surface pieces in a horizontal position, whereby the surface pieces convey the material to the ends of the platform to avoid frictional transport of the material. When a pile of the fibrous material is present in the bin on the lower conveyor, the pile holds the surface pieces of the lower course of the stud link chain conveyor in a horizontal position to convey material dropped from the end of the platform to the end of the pile, for discharge at the end of the pile away from the discharge device. The surface pieces thereby support and transport the material carefully and without unnecessary movement or friction. In the discharge region of the device, a second outer discharge device is provided to remove the material from the first inner discharge device, so that the material cannot be returned to the bin to result in undesired compression and bunching of the material.

In an especially advantageous embodiment of the invention, the discharge device is comprised of two vertical rows of spiked rollers, the spiked rollers of adjacent rows intermeshing with one another. In this arrangement, the inner row receives material from the conveyor within the bin, and the outer spiked roller row takes over material from the inner spiked roller row to prevent undesirable return of the material to the bin. The outer spiked roller row also serves to break up any bunched fibrous material.

Further, in accordance with the invention, the spiked rollers of the two rows are driven at different speeds, i.e. the outer rollers are driven at faster speeds than the inner spiked rollers. This improves the transfer of the fibrous material. In a still further embodiment of the invention, the operation of the device is improved by employing spikes of different thicknesses and lengths on the two spiked rollers.

BRIEF FIGURE DESCRIPTION

In order that the invention will be more clearly understood, it will now be described, by way of example, with reference to the accompanying drawings, wherein.

DETAILED DESCRIPTION OF EXAMPLE EMBODIMENTS

Figure 1:
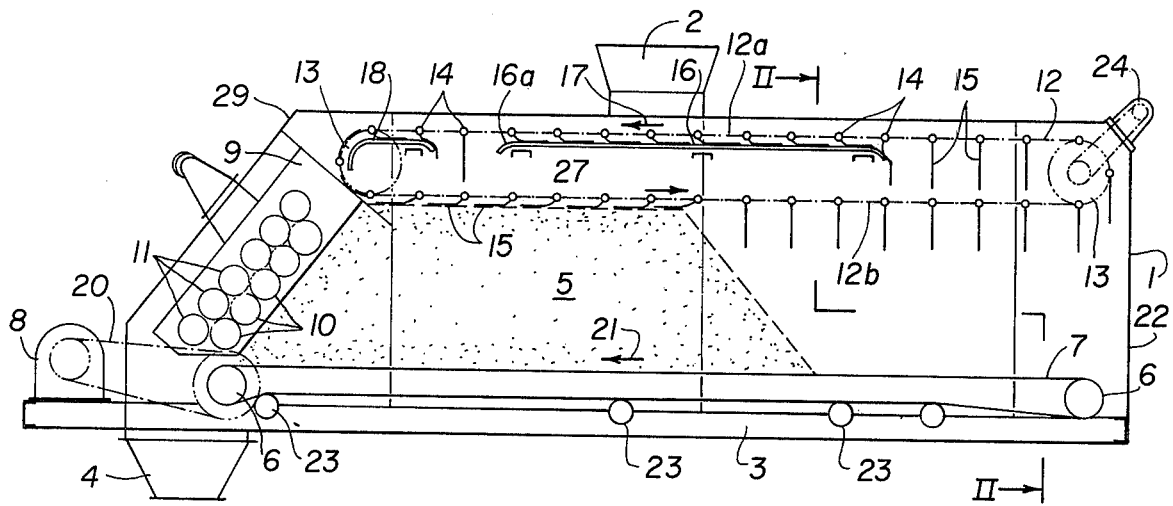
FIG. 1 is a simplified vertical lengthwise cross sectional view of a feed regulating bin conveyor in accordance with the invention.
Figure 2:
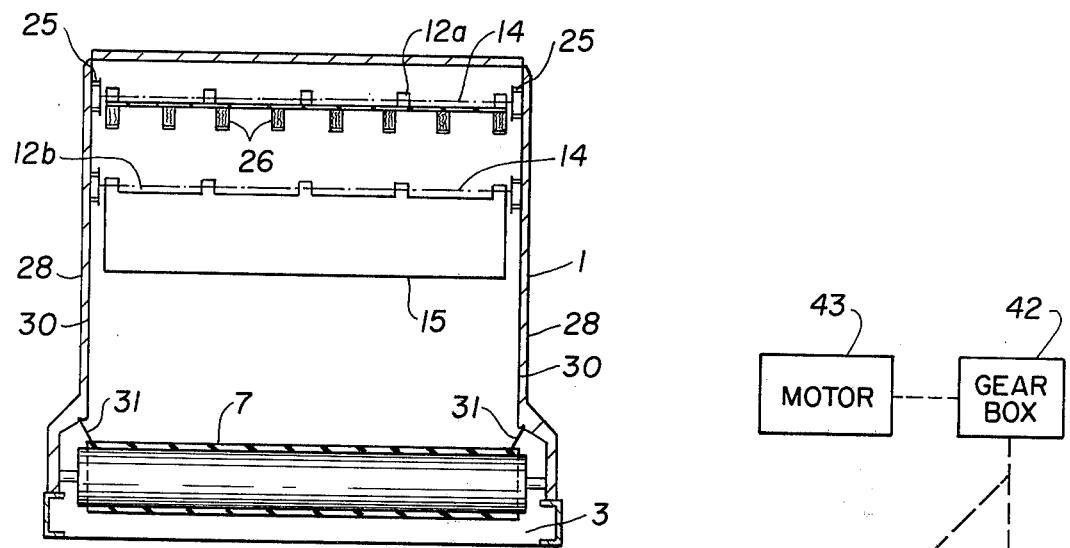
FIG. 2 is a cross sectional view of the feed regulating conveyor bin of FIG. 1, taken along the lines II—II.

FIGS. 1 and 2 illustrate a feed regulating conveyor bin in accordance with the invention comprising an outer housing 1. The upper central portion of the housing is provided with an opening 2 for receiving fibers from a suitable source (not shown). The housing 1 rests on a frame 3 shown in FIG. 2. An outlet opening 4 is provided in the bottom of the housing at one end thereof, the opening 4 extending, for example, below the frame 3. The material, for example, for the production of fiber board, emerges continuously from the opening 4.

A material belt conveyor 7 is arranged horizontally in the bottom of the housing 1. The conveyor 7 extends around rotatable rollers 6 disposed at opposite ends of the housing. A pile 5 of fibrous material rests on the upper run or course of the conveyor belt 7. At least one of the rollers 6 is driven by a motor 8, by suitable means such as a drive belt 20 so that the upper course of the conveyor 7 is driven in the direction of arrow 21 toward the outlet opening 4 from the opposite end 22 of the housing. Suitable additional support rollers 23 may be provided, for example, for supporting the lower run of the conveyor 7. The conveyor belt 7 moves the material 5 toward a discharge device 9 comprising two rows of spiked rollers 10 and 11. The discharge device will be described in more detail below.

A stud link chain conveyor 12 having an upper run or course 12a and a lower run or course 12b is arranged horizontally in the upper region of the housing 1. The conveyor 12 extends around rotatable sprocket wheels 13. At least one of the sprocket wheels 13 is driven by a motor, for example, motor 24 by suitable conventional means, so that the upper course 12a of the stud link chain conveyor 12 is driven in the same direction as the upper course of the conveyor 7, as indicated by the arrow 17. The stud link chain conveyor 12 may comprise, for example, endless chains 25, extending around and driven by the sprocket wheels 13. Stud links 14 extend transversely of the housing between the chains 25. The stud links 14 are uniformly spaced from each other along the length of the chains 25.

A platform 16 is located in the housing below the inlet opening 2 and beneath the upper run 12a of the stud link chain conveyor 12. As illustrated in FIG. 2, the platform 16 may, for example, comprise a plurality of longitudinally extending horizontal bars 26 supported, as illustrated in FIG. 1, by beams 27 extending transversely of and secured to the side walls 28 of the housing. The platform 16 terminates, at 16a ahead of the sprocket wheel 13 near the end 29 of the housing 1 and the inlet opening 2. The other end of the platform 16 terminates between the inlet opening 2 and the sprocket wheel 13 adjacent the end 22 of the housing 1.

A surface piece 15 having a smooth surface and made of a sufficiently flexible material such as rubber or the like, is hinged to each of the stud links 14 of the conveyor 12. As illustrated in FIG. 1, the surface pieces 15 have a length greater than the distance between the adjacent stud links. As illustrated in FIG. 2, the surface pieces 15 have a width substantially equal to the width of the housing 1. As illustrated in FIG. 2, the bin in accordance with the invention has inner housing wall surfaces 30 and the outer edges or ends of the surface pieces 15 reach as close as possible to these surfaces 30. Suitable sliding seals 31 may be provided extending to the conveyor 7 to prevent material from falling from the sides of the conveyor 7.

A guide platform 18, similar to the platform 16, may be provided around the sprocket wheel 13 adjacent the end 29 of the housing. The platform 18 is spaced from the platform 16 to sufficiently permit each surface piece 15 to hinge completely downwardly when it clears the forward end 16a of the platform 16. Further, the guide platform 18 is so bent as to assure that the surface pieces will move in a substantially horizontal position onto the pile 5.

The discharge device 9 is located in the housing 1 adjacent the end 29 of the housing. As mentioned, the discharge device comprises two inclined rows of spiked rollers, namely an inner inclined row 10' of spiked rollers 10 facing the pile 5 in the housing 1, and an outer inclined row 11' of spiked rollers 11 facing the end 29 of the housing 1. The axes of the spiked rollers of the rows 10 and 11 are substantially parallel to the axes of the rollers 6 and 13. The rollers of the rows 10 and 11 are driven by suitable motor and gear means, see FIG. 3.

The inner row 10' of rollers 10 is arranged so that any material of the conveyor 7 is driven against the inner row 10' of spiked rollers 10. The rows 10' and 11' of spiked rollers are inclined inwardly in a direction so that their upper rollers are closer to the end 22 of the housing than the lower rollers.

In operation, fibrous material, for example, fibers for the production of hard fiber boards, are fed from a suitable supply into the inlet opening 2 and thence onto the upper course 12a of the stud link chain conveyor 12. Since the platform 16 immediately underlies the upper course of the stud link chain conveyor 12, the surface pieces 15 at this location of the conveyor 12 will lie horizontally and be supported on the platform 16. It is thus apparent that the fibrous material fed into the housing 1 by way of the opening 2 will be supported and conveyed on one side of the surface pieces 15, and hence will not frictionally engage the platform 16.

The fibrous material will be thus transported in the direction indicated by the arrow 17, toward the end 29 of the housing, until the surface pieces 15 pass the end 16a of the platform 16. The surface pieces 15, being no longer supported by the platform 16, thus hinge downwardly to discharge any fibrous material lying thereon. Fibrous material which has previously been stored in the bin, as indicated at 5, will accumulate on the end of the conveyor 7 toward the discharge device 9. As a consequence, the thus stored fibrous material will maintain the surface pieces 15 in the lower course 12b of the conveyor 12 in a horizontal position at the end 29 of the bin, as illustrated in FIG. 1, until the surface pieces 15 pass the end of the pile 5 of fibrous materials toward the end 22 of the housing. Thus, fibrous material dropping from the upper course 12a of the conveyor at the end 16a of platform 16 will drop onto the other sides of the surface pieces 16 of the lower course 12b of the conveyor and be conveyed toward the end 22 of the housing to be discharged by hinging of the surface pieces at the end of the pile 5 of stored material.

It should be noted that the surface pieces 15 are preferably of rubber or similar flexible material.

The fibrous material thus stored in the housing 1 on the conveyor 7 is slowly conveyed toward the discharge device 9. Specifically, the material is directed to the inner row 10' of spiked rollers, whereby it is picked up by the inner row of spiked rollers, and conveyed to the outer row of spiked rollers. The outer row 11' of spiked rollers takes the fibrous material from the spikes of the inner row and discharges the material through the discharge opening 4.

As is apparent from FIG. 1, the fibrous material conveyed by the conveyor 12 is transported to the end of the pile 5 of fibrous material on conveyor 7 toward the end 22 of the housing, so that the fibrous material first fed to the apparatus is also first discharged through the outlet opening 4. Since the fibrous material is conveyed only on the preferably smooth surfaces of the surface pieces 15, there is no frictional contact between the fibers and stationary parts of the apparatus, and hence damage to the fibers is prevented.

Figure 3:
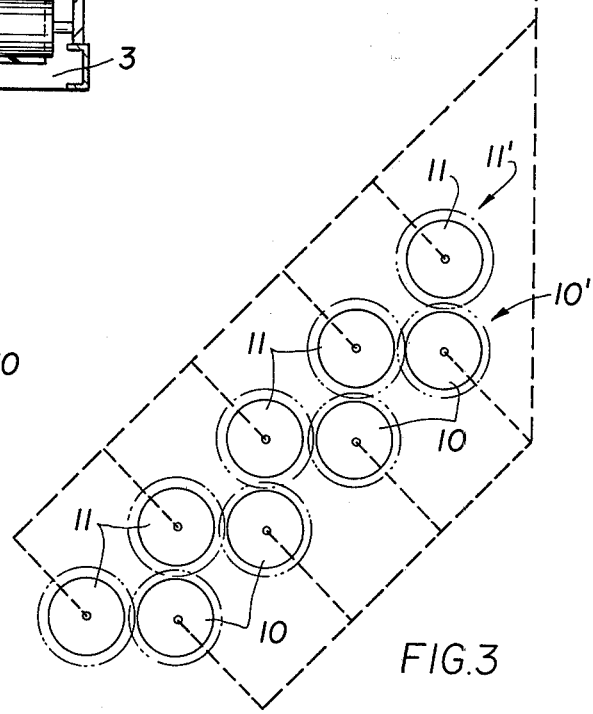
FIG. 3 is a simplified illustration of the spiked roller discharge device employed in the conveyor bin of FIG. 1.

The discharge arrangement 9 is illustrated in greater detail in FIG. 3, wherein it is shown that the spiked rollers 10 of the inner row 10' are disposed in a vertically inclined row over one another to intermesh with the spiked rollers 11 of the outer row 11''. The spiked rollers 11 are also arranged in a vertically inclined row over one another. The spiked rollers 40 of row 10' do not intermesh with one another. The spiked rollers 11 of the outer row 11' also do not intermesh with one another. The rollers 11 are preferably driven at a rotational speed greater than the rollers 10. Such different speeds may be effected by any conventional means. For example, as illustrated in FIG. 3, the rollers of the rows 10' and 11' may be separately, mechanically coupled to a gear box 42 driven by a motor 43, so that the rotational speed of the rollers 11 is greater than that of the rollers 10. As a result of this differential in speed, the fibrous material is taken over by the rollers 11 from the rollers 10 faster than it can be fed to the rollers 10 by the belt conveyor 7. Hence, compression and balling up of the fibrous material as it approaches the discharge device 9 on the conveyor 7 is prevented. Further, the outer row 11' of spiked rollers inhibits the material on the spikes of the spiked rollers 10 from being returned to the pile 5. Hence, varying the density of the fibers in the region of the pile 5 adjacent the discharge device 9 is also prevented.

Figure 4:
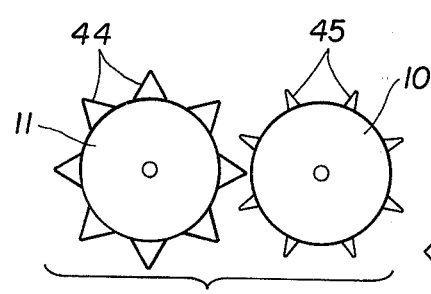
FIG. 4 is a simplified illustration of a portion of a modification of the spiked rollers of FIG. 3.

The spikes of the rollers 10 and 11 may have equal thicknesses and lengths, although alternatively, as illustrated in FIG. 4, the thicknesses and lengths of the spikes on these rollers may differ. Thus, the spikes 44 on the rollers 11 are longer and thicker than the spikes 45 on the rollers 10. It has been found that this arrangement of spikes improves the discharge of fibrous material from the feed regulating conveyor bin in accordance with the invention. Further, the spike density, namely, the number of spikes per square area may be varied. For example, the number of spikes on the surface of the rollers forming the outer row 11' may be larger than the number of spikes on the inner row 10' to increase the efficiency of material removal.

Although the invention has been described with reference to specific example embodiments, it is to be understood, that it is intended to cover all modifications and equivalents within the scope of the appended claims.

What is claimed is:

1. In a dosing bin for discharging loose, fibrous material, having a top and a supply opening in said top, a bottom and a discharge opening in said bottom, which bin further includes a first endless feed advance conveyor adjacent to the bottom of the bin and discharge means located adjacent to and above said discharge opening in said bin, said first conveyor moving with its upper run toward said discharge means, and wherein a second endless conveyor is arranged adjacent to said top of said bin, said second conveyor having an upper run also moving toward said discharge means and a lower run moving in the opposite direction, said upper run of said second conveyor receiving material through said supply opening in the top of the bin, a platform arranged in the bin below said supply opening, said upper run of said second conveyor depositing the received material on the lower run of the second conveyor for moving the material away from said discharge opening of said bin, the improvement wherein said second endless conveyor comprises cross bars and endless driven means supporting said cross bars at given spacings between adjacent cross bars, and flexible surface means secured to said cross bars, said surface means having a dimension perpendicularly to said cross bars larger than said given spacings between adjacent cross bars, said flexible surface means being dragged along the top of the material in the bin as the lower run of the second conveyor moves away from said discharge opening of the bin, said discharge means comprising two rows of discharge elements, said rows being arranged in parallel to each other so that one row of discharge elements is located to face the material in the bin.

2. The dosing bin according to claim 1, wherein said discharge means comprise two rows of spiked rollers arranged in parallel to each other and so that one row is effective after the other, and wherein the spiked rollers in one row are arranged to mesh with the spiked rollers in the other row.

3. The dosing bin according to claim 2, comprising means for driving said spiked rollers of one row with a speed differing from that in the other row.

4. The dosing bin according to claim 2, wherein said spiked rollers in one row comprise a number of spikes which number differs from the number of spikes on the other row.

5. The dosing bin according to claim 2, wherein the length of the spikes in one row differs from the length of the spikes in the other row.

6. The dosing bin according to claim 1, wherein said flexible surface means have a smooth surface.

7. A feed regulating conveyor bin for fibrous material, comprising first and second horizontal endless conveyors, said first conveyor being mounted for movement above and parallel to said second conveyor, and comprising a pair of endless drive supports, a plurality of spaced apart links extending transversely between said pair of endless drive supports and a flexible surface piece hinged to each link and having a length larger than the distance between adjacent links, said first conveyor having upper and lower courses, said bin further comprising a discharge opening, and an inlet opening above the upper course of said first conveyor for receiving fibrous materials, and a platform beneath said upper course of said first conveyor in the region of said inlet opening, whereby said platform holds said surface pieces in a substantially horizontal position to receive and transport said fibrous materials supplied into the bin, said surface pieces hinging downwardly at the end of said platform to drop material on the surface pieces toward said lower course of the first conveyor whereby the surface pieces along the lower course of the first conveyor transport the material away from the discharge opening in the bin, discharge means for receiving and discharging material from the upper course of said second conveyor adjacent to and through said discharge opening and means operatively connected to said first and second conveyors for moving said first and second conveyors so that the upper courses of both conveyors move in the same direction, whereby said surface pieces on the lower course of said first conveyor are held in a horizontal position by sliding over the fibrous material in the bin to thus receive and transport fibrous material dropped from the upper course of said first conveyor away from said discharge opening.

8. The feed regulating conveyor bin of claim 7, wherein said discharge device means comprises a pair of rows of parallel spiked rollers mounted with an angle relative to the vertical and thus slanted toward the fibrous material in the bin, said spiked rollers being further mounted for rotation to receive material from said second conveyor the spiked rollers of each row being intermeshed with at least one spiked roller of the other row and free of intermeshing with spiked rollers of the same row, and means for rotating said spiked rollers.

9. The feed regulating conveyor bin of claim 8, wherein said spiked roller rows comprise a first row adjacent to the material in the bin and a second roller row adjacent to the first row, and means for rotating said spiked rollers of the first row more slowly than the spiked rollers of the second row, whereby the spiked rollers of said first row receive fibrous material from said second conveyor, and the spiked rollers of said second row receive fibrous material from the spiked rollers of said first row.

10. The feed regulating conveyor bin of claim 9, wherein the spikes of the spiked rollers of said second row have spikes that are longer and thicker than the spikes of the rollers of said first row.

11. The feed regulating conveyor bin of claim 7, wherein said flexible surface pieces transport the material away from said discharge opening in the bin thus assuring that the throughput is on a first-in first-out basis.

* * * * *